(12) United States Patent
Pritchard et al.

(10) Patent No.: US 7,320,659 B2
(45) Date of Patent: Jan. 22, 2008

(54) DIFFERENTIAL ASSEMBLY WITH SEMI-ELLIPTICAL ASSEMBLY WINDOW

(75) Inventors: John P. Pritchard, New Baltimore, MI (US); Paul H. Petruska, Royal Oak, MI (US); Howard J. Bruno, Bloomfield Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 225 days.

(21) Appl. No.: 11/118,919

(22) Filed: Apr. 29, 2005

(65) Prior Publication Data

US 2006/0243092 A1    Nov. 2, 2006

(51) Int. Cl.
F16H 57/02 (2006.01)
F16H 57/04 (2006.01)
F16H 61/00 (2006.01)
F16H 48/06 (2006.01)
F16H 57/08 (2006.01)

(52) U.S. Cl. ............... 475/331; 475/220; 74/606 R
(58) Field of Classification Search ........ 475/331, 475/230, 220; 74/606 R, 607
See application file for complete search history.

(56) References Cited

U.S. PATENT DOCUMENTS

| | | | |
|---|---|---|---|
| 4,543,853 A * | 10/1985 | von Hiddessen et al. ... | 475/246 |
| 5,234,388 A * | 8/1993 | Nordkvist ................ | 475/246 |
| 5,389,048 A | 2/1995 | Carlson | |
| 5,480,360 A | 1/1996 | Patzer et al. | |
| 5,545,102 A | 8/1996 | Burgman et al. | |
| 5,554,081 A | 9/1996 | Bowerman | |
| 5,584,777 A * | 12/1996 | Sander et al. ............. | 475/230 |
| 5,733,216 A | 3/1998 | Bowerman | |
| 5,842,946 A | 12/1998 | Ichiki | |
| 5,938,558 A | 8/1999 | Eybergen et al. | |
| 5,951,431 A | 9/1999 | Downs et al. | |
| 6,010,424 A * | 1/2000 | Irwin ..................... | 475/231 |
| 6,053,838 A | 4/2000 | Gage | |
| 6,325,737 B1 | 12/2001 | Zinke et al. | |
| 6,436,002 B1 | 8/2002 | Ishikawa et al. | |
| 6,743,136 B1 | 6/2004 | Jensen | |
| 7,217,217 B2 * | 5/2007 | Santelli ................... | 475/230 |
| 7,223,192 B2 * | 5/2007 | Kashiwazaki ............. | 475/230 |
| 2006/0084546 A1 * | 4/2006 | Kohno et al. .............. | 475/160 |

* cited by examiner

Primary Examiner—Tisha Lewis
(74) Attorney, Agent, or Firm—Harness, Dickey & Pierce, P.L.C.

(57) ABSTRACT

A differential case is provided including at least one assembly window formed therein for providing access to a chamber interior of the differential case. The assembly window in the differential case is defined by a semi-elliptical segment having ends interconnected by a pair of elongated edge portions of the differential case. The pair of elongated edge portions are interconnected by an arcuate segment. The assembly window has a dimension slightly larger than an outside diameter of a side gear so as to allow angulated entry of the side gears into the chamber and subsequent alignment relative to a longitudinal axis. The assembly window is further shaped to allow entry of the pinion gears into the chamber and subsequent alignment relative to another longitudinal axis.

22 Claims, 6 Drawing Sheets

US 7,320,659 B2

DIFFERENTIAL ASSEMBLY WITH SEMI-ELLIPTICAL ASSEMBLY WINDOW

BACKGROUND OF THE INVENTION

The present invention relates generally to automotive differentials and, more particularly, to a differential case having an optimized geometry for the assembly windows formed therein.

Differentials are used in the drivetrain of motor vehicles for delivering drive torque to the wheels while permitting speed differentiation therebetween. Referring to FIGS. 1 and 2, a prior art differential unit 10 is shown to include a differential case 12 supported at its opposite axial ends by bearing assemblies 14 for rotation relative to a differential carrier or housing 16. Housing 16 can be part of an axle assembly of the type used in rear-wheel drive vehicles or, in the alternative, can be incorporated into the transaxle of a front-wheel drive vehicle. Differential case 12 is formed to include an enlarged interior chamber 18 within which a gearset is retained. Differential case 12 also includes a pair of first apertures 20 and a pair of second apertures 22, with both pairs of apertures communicating with chamber 18. In addition, differential case 12 includes a radial flange 24 to which a ring gear 26 is secured, such as by bolts 28. A pinion shaft 30 extends between first apertures 20 and is rigidly fixed to differential case 12 by a locking pin 32 retained in a bore 33.

The gearset includes a pair of pinion gears 34 which are supported on pinion shaft 30 within chamber 18 for rotation about its longitudinal axis, denoted in FIG. 1 by construction line "A". Each pinion gear 34 is meshed with a pair of side gears 36 which, in turn, are each journally supported for rotation about the longitudinal axis of differential case 12, denoted by construction line "B". The axial ends of differential case 12 define a pair of tubular hubs 38 and 40 which journally support a pair of axle shafts 42 and 44, respectively, and upon which bearing assemblies 14 are mounted. One end of axle shaft 42 is fixed (i.e., splined) to one of side gears 36 while its opposite end is fixed, via a halfshaft or similar device, to one of the vehicle's wheels. Similarly, one end of axle shaft 44 is fixed (i.e., splined) to the other one of side gears 36 while its opposite end is fixed to the other of the vehicle's wheels. As is conventional, ring gear 26, and differential case 12 to which it is attached, are rotated within housing 16 by an input drive pinion (not shown) which is secured to the end of a drive shaft (not shown). As such, rotary motion of differential case 12 is delivered to axle shafts 42 and 44 through engagement of pinion gears 34 and side gears 36 to permit relative rotation therebetween.

According to the conventional assembly process for differential unit 10, side gears 36 and then pinion gears 34 are sequentially assembled into chamber 18 by passing them through second apertures 22, hereinafter referred to as assembly windows. Referring to FIG. 2, both of assembly windows 22 are shown to be generally rectangular in shape with an axial dimension "X" and a circumferential or lateral dimension "Y". A significant design constraint is that lateral dimension "Y" has traditionally been greater in size than the outer diameter of side gears 36 so as to allow entry thereof into chamber 18 and to permit subsequent alignment of side gears 36 relative to rotary axis "B". Similarly, axial dimension "X" must be greater in size than the outer diameter of pinion gears 34 to permit entry thereof into chamber 18 and subsequent alignment in meshed engagement with side gears 36. Thereafter, pinion gears 34 are rotated into alignment with first apertures 20 for receipt of pinion shaft 30. Due to the need for the assembly windows, design compromises are required because the differential case 12 must be strong enough to withstand the maximum operating stresses that are anticipated to be applied thereon during the service life of differential unit 10 while attempting to minimize the weight of the housing 16.

SUMMARY OF THE INVENTION

Based upon the foregoing, there is a need to provide an optimized geometry for the assembly windows in the differential case which facilitates easy assembly of the gear components while improving the structural and functional characteristics of the differential case. It is therefore an object of the present invention to provide a geometry for the assembly windows of the differential case which overcomes the deficiencies of the prior art.

It is a further object of the present invention to provide assembly windows in a differential case wherein the geometry or shape of the assembly windows is a function of a differential gear diameter plus a minimum clearance.

As another object of the present invention, the weight of the differential case is minimized.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
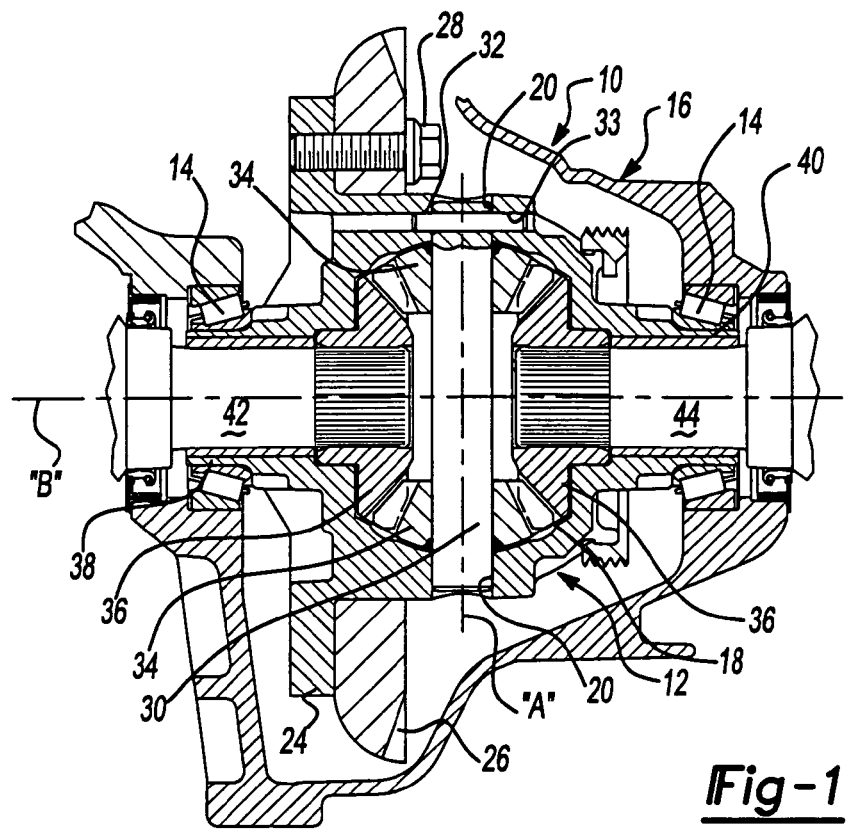
FIG. 1 is a sectional view of a conventional differential unit incorporated into a motor vehicle axle assembly.
Figure 2:
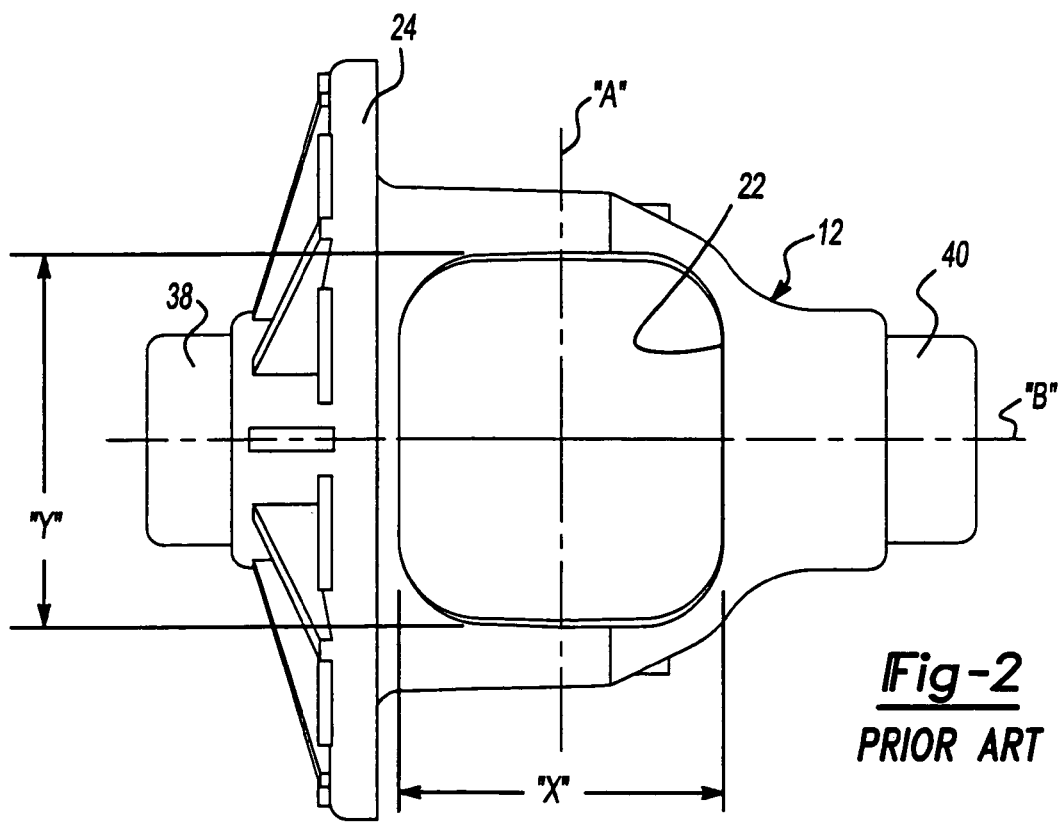
FIG. 2 is a side view of a differential case similar to that used with the differential unit shown in FIG. 1.
Figure 3:
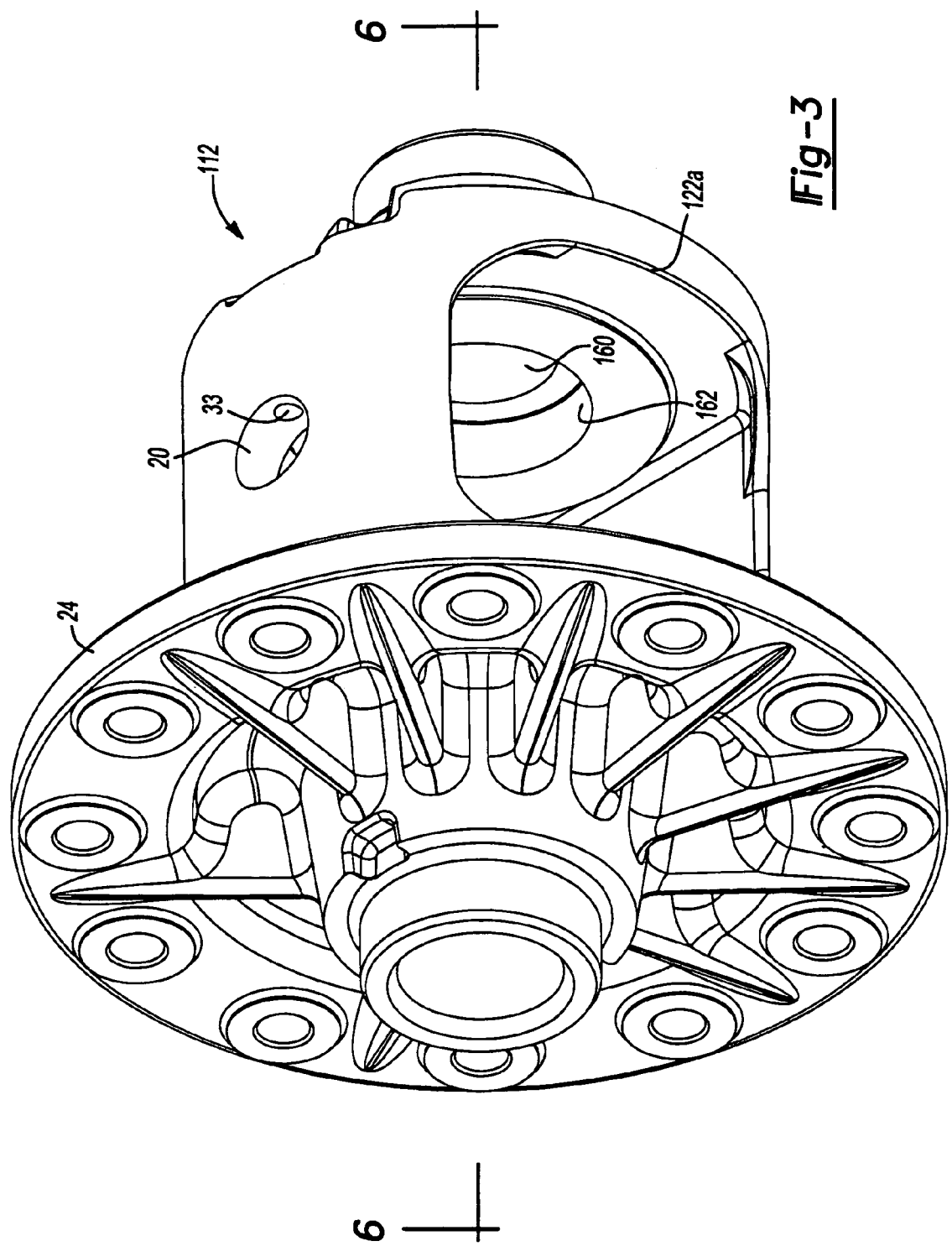
FIG. 3 is a perspective view of a differential case according to a preferred embodiment of the present invention.

Referring now to the drawings, and specifically to FIGS. 3 through 6, a differential case 112 is shown which is a modified version of differential case 12 shown in FIG. 2 and which can be used in substitution thereof in differential unit 10 to provide various structural advantages. For purposes of comparison, like reference numerals are used hereinafter to identify those components or elements of differential case 112 which are similar to those previously described.

Figure 4:
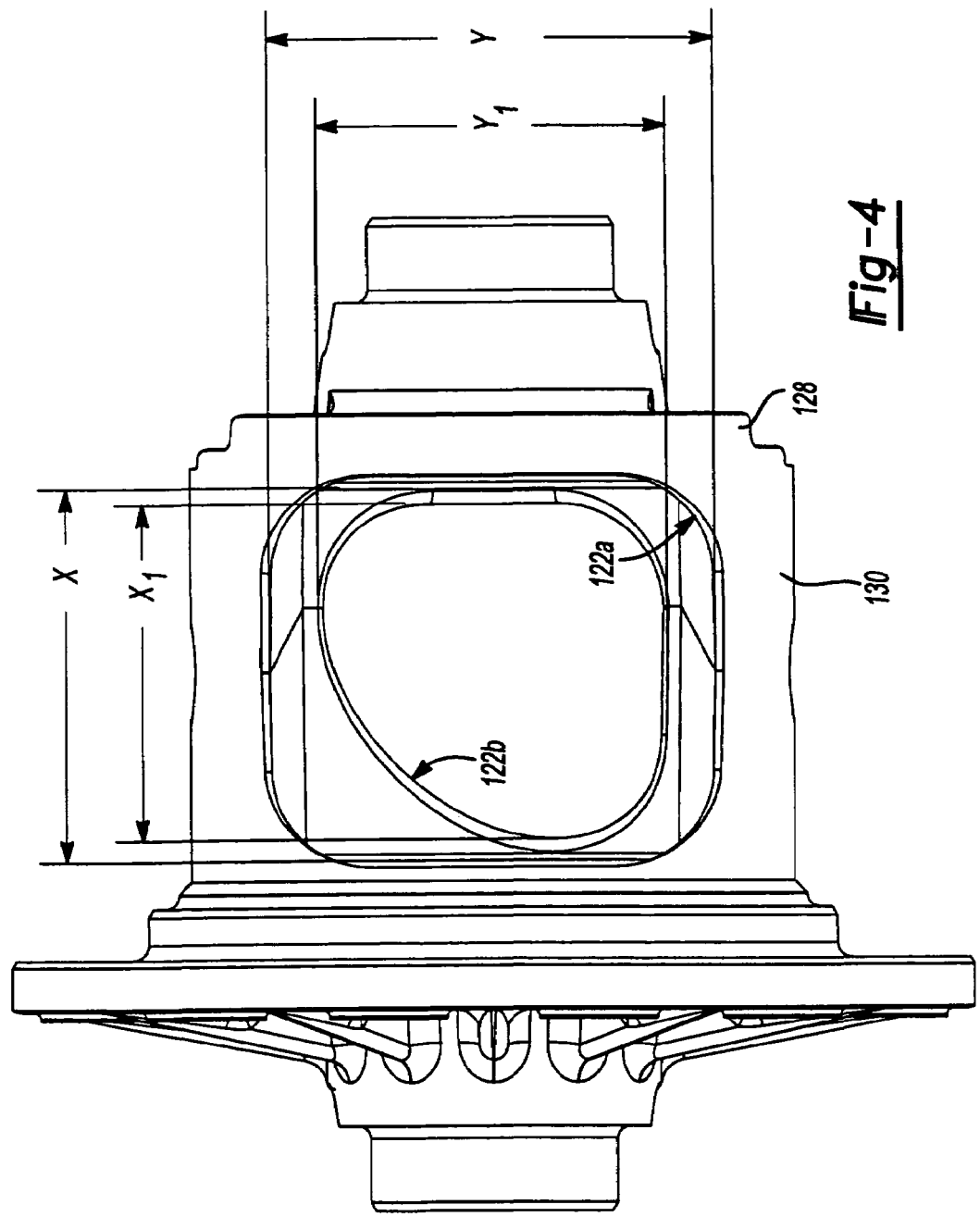
FIG. 4 is a side view of the differential case shown in FIG. 3.
Figure 5:
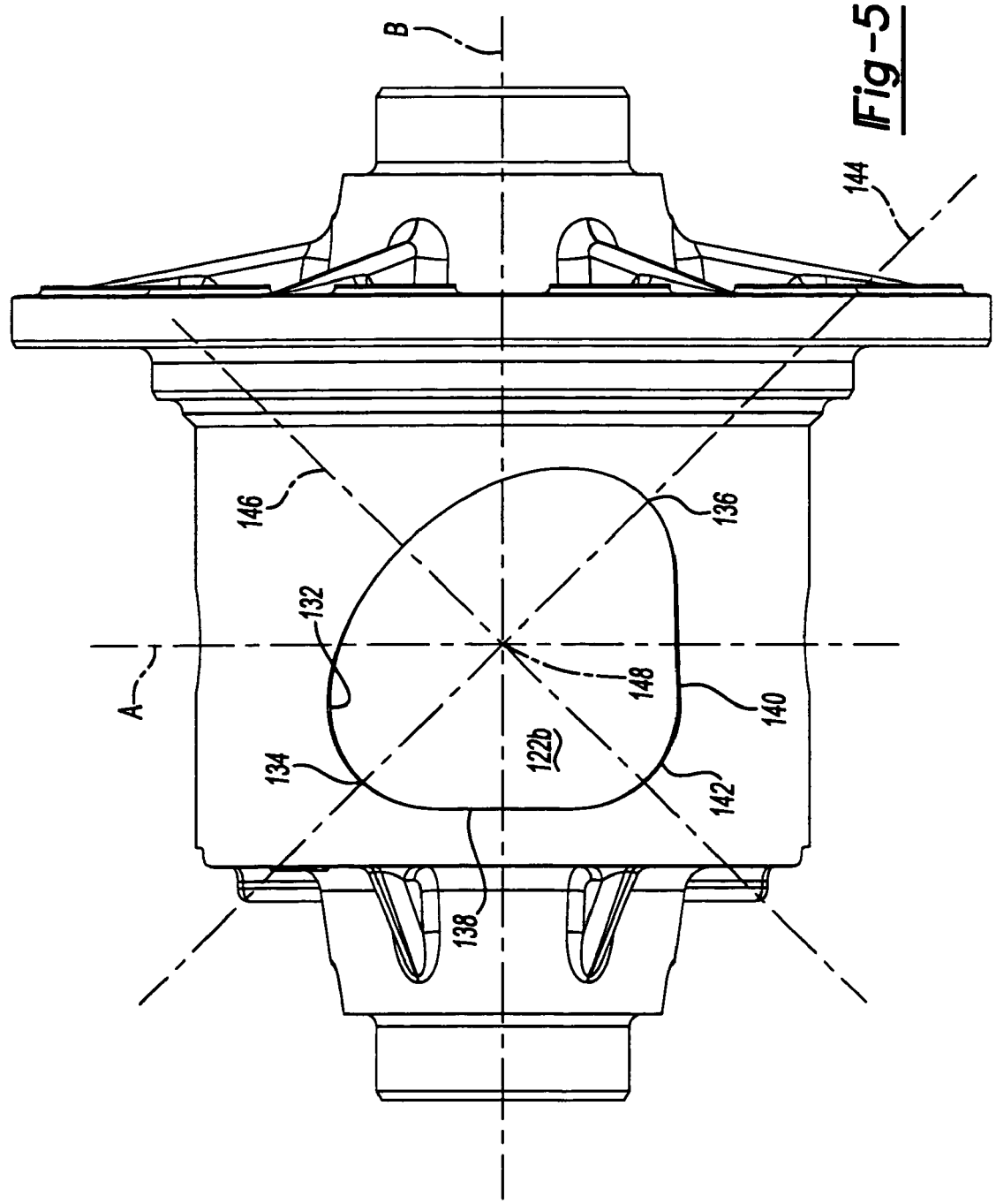
FIG. 5 is an opposite side view of the differential case shown in FIG. 4.

In general, differential case 112 has a pair of apertures or assembly windows 122a and 122b, shown respectively in FIGS. 4 and 5, where assembly window 122b has a modified geometry compared to assembly window 22 of FIG. 2. Assembly window 122a is substantially similar to assembly window 22 and includes a rectangular shape having an axial dimension "X", and a lateral dimension "Y". Assembly window 122b is irregularly shaped having an axial dimension "$X_1$" and a lateral dimension "$Y_1$". One advantage of the present invention resides in the fact that "$Y_1$" is less than "Y" such that the circumferential portion of barrel segment 128, hereinafter referred to as web portion 130, located between assembly windows 122a and 122b is wider than previously available. Such additional width effectively reduces the maximum bending stress acting on barrel segment 128 of differential case 112 which, in turn, may permit the use of reduced casing thickness, a larger second assembly window and/or the use of alternative materials having lower fatigue characteristics such as, for example, aluminum or magnesium.

A comparison of the maximum bending stress for a given loading condition of a conventional differential case 12 having two windows with lateral dimension "Y" of about 105 mm and differential case 112 having a first window lateral dimension "Y" of about 98 mm and a second window lateral dimension of "$Y_1$" of about 76 mm yields a 14% reduction in maximum stress. This stress reduction is significant because it allows the size and shape of assembly window 122a to remain relatively large thereby reducing the mass of differential case 112 and easing the gear assembly procedure. Specifically, assembly window 122a is generally an enlarged rectangular opening having dimensions "X" and "Y" larger than the greatest dimension of pinion gears 34 or side gears 36. One skilled in the art will appreciate that while the embodiment depicted in the drawings includes one semi-elliptically shaped assembly window and one rectangularly shaped assembly window, an embodiment including two semi-elliptically shaped assembly windows is contemplated and is within the scope of the present invention.

Assembly window 122b includes a semi-elliptical segment 132 having ends 134 and 136 connected to a first elongated segment 138 and a second elongated segment 140. First and second elongated segments 138 and 140 are interconnected by an arcuate segment 142. Semi-elliptical segment 132 includes a major axis 144 and a minor axis 146. Major axis 144 intersects minor axis 146 at a point 148. Point 148 is positioned substantially along a line extending through the intersection of axis "A" and axis "B" where the line extending through the two center points extends perpendicularly from a plane in which both axis "A" and axis "B" lie. Additionally, major axis 144 is oriented at a substantially 45 degree angle relative to differential housing rotary axis "B".

First elongated segment 138 linearly extends substantially parallel to rotary axis "A". Second elongated segment 140 extends linearly in a direction substantially parallel to rotary axis "B". First elongated segment 138 is substantially equal in length to second elongated segment 140. Furthermore, first elongated segment 138 and second elongated segment 140 are substantially symmetrically positioned about minor axis 146 such that assembly window 122b is symmetrically formed about minor axis 146.

Assembly window 122a is rectangularly shaped and substantially diametrically opposed to assembly window 122b. Window assembly 122a is also positioned such that a center point of the aperture is aligned with a line passing through the intersection of minor axis 146 and major axis 144 as well as the intersection of rotary axes "A" and "B".

Figure 6:
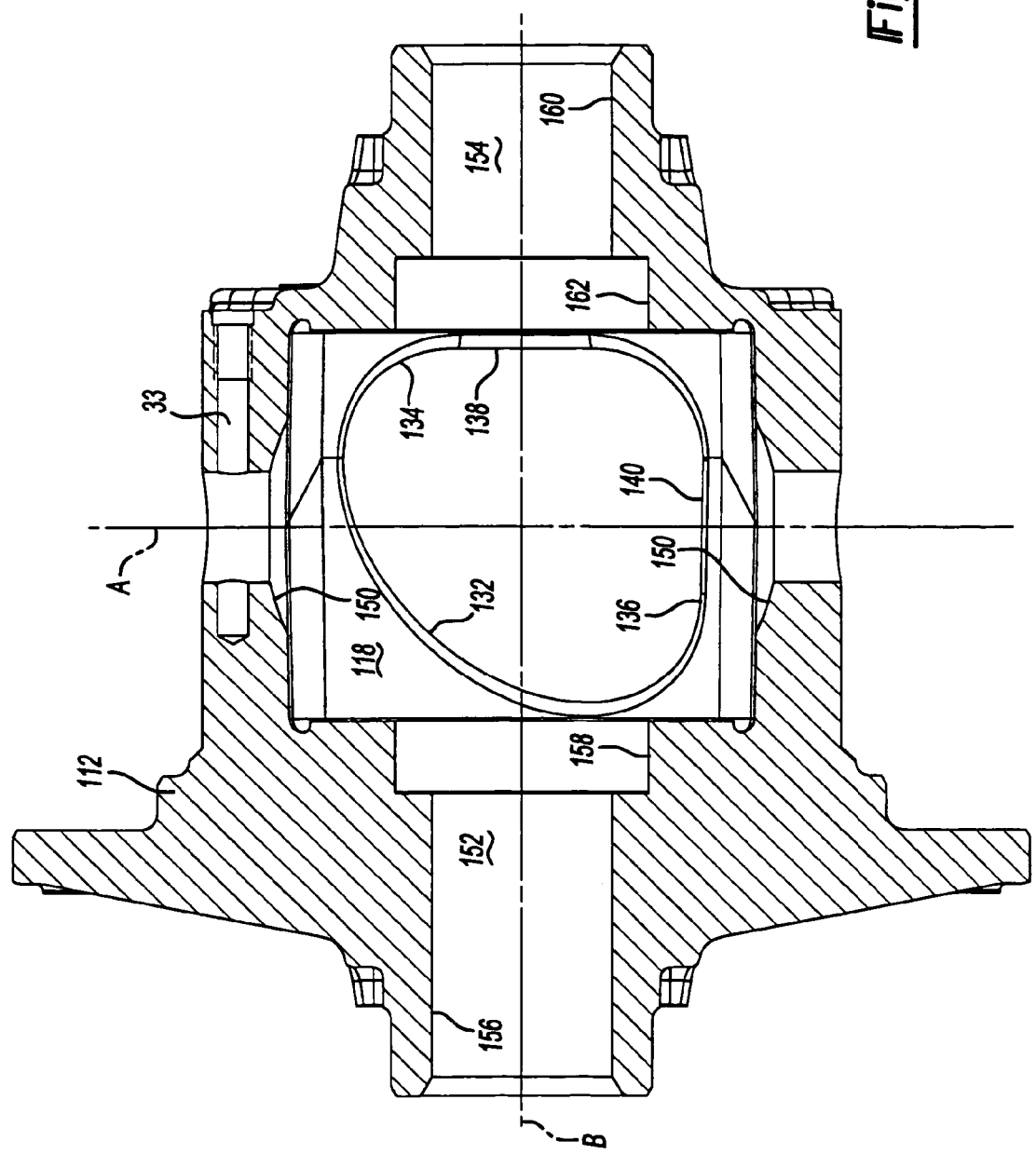
FIG. 6 is a sectional view taken generally along line 6-6 of FIG. 3.

Referring now to FIG. 6, a sectional view of differential case 112 illustrates chamber 118 as being substantially rectangular with substantially spherically shaped cavities 150. Chamber 118 communicates with a pair of axial bores 152 and 154 aligned along axis "B". Axial bore 152 includes a first segment 156 adapted to receive axle shaft 42 therein and a second segment 158 adapted to receive an axial hub segment of side gear 36 therein. Second segment 158 has a greater diameter than first segment 156 and functions to properly seat side gear 36 relative to chamber 118 and axial bore 152. In a like manner, axial bore 154 includes a first segment 160 adapted to receive axle shaft 44 and a second segment 162 adapted to receive an axial hub segment of the other side gear 36 therein.

Figure 7:
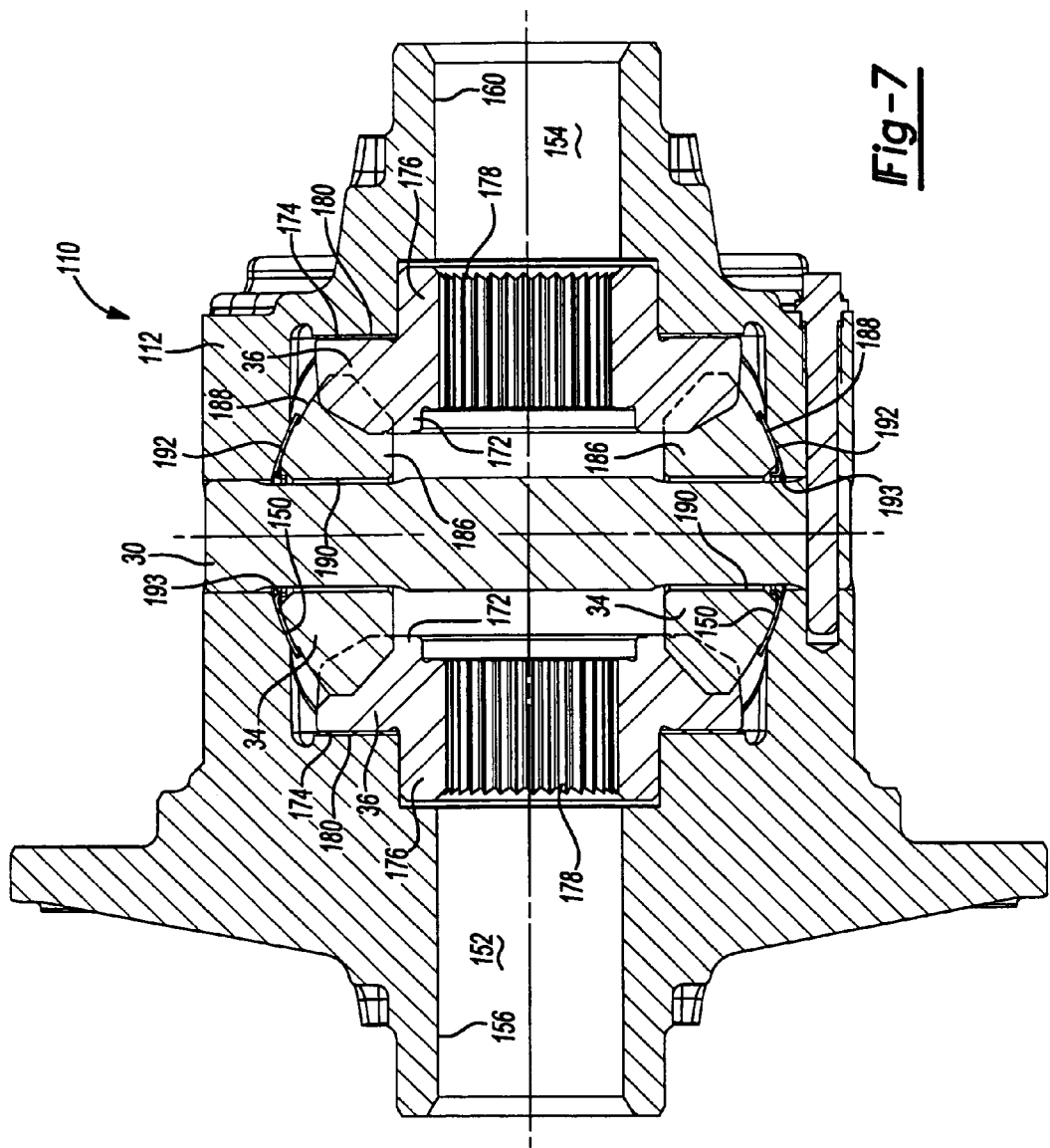
FIG. 7 is a sectional view of a differential unit of the present invention.

Referring now to FIG. 7, a preferred construction for a differential 110 is shown which includes differential case 112 discussed above. Side gears 36 are shown to include a front gear segment 172, a rear thrust face 174, and an axial hub 176. Internal splines 178 formed in axial hub 176 are provided for meshed engagement with corresponding external splines on the axle shafts. Rear thrust face 174 is substantially planar in contour and is configured to match the local contour of chamber 118. Thrust plates 180 are used between chamber 118 and each side gear 36 to absorb thrust loading and provide a hardened sliding surface against which each side gear 36 can rotate. Differential 110 is shown to include pinion gears 34 each having a front gear segment 186, a rear thrust face 188, and a bore 190 adapted to receive pinion shaft 30 therein. Rear thrust face 188 is partially spherical in contour and is configured to match the spherical contour of one of cavities 150. Partially spherical thrust plates 192 are also used in association with pinion gears 34 to provide a hardened sliding surface relative to differential case 112. Thrust plates 192 include an inwardly extending lip 193 positioned within bore 190 to maintain the proper position of each thrust plate 192 relative to each pinion gear 34.

The optimized assembly window geometry detailed above provides several advantages over conventional differential cases. First, it is possible to reduce the maximum bending stress compared to conventional assembly window geometry. It also permits an alternate embodiment such as a reduced mass differential case having a larger second assembly window. Additionally, the optimized window geometry allows for the manufacture of a differential case from less dense materials.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A differential assembly adapted to transfer the rotational energy from a drive shaft to an axle shaft, the differential assembly comprising:

a differential case including at least two apertures formed therein to provide access to a chamber interior of the differential case such that gears of a gear set may be passed through either of said apertures and retained in said chamber, one of said apertures being defined by a semi-elliptical segment having ends interconnected by a pair of elongated segments, said elongated segments being interconnected by an arcuate segment.

2. The differential case of claim 1 wherein one of said elongated segments extends substantially parallel to a central rotary axis of the differential case.

3. The differential case of claim 2 wherein one of said elongated segments extends substantially perpendicular to a central rotary axis of the differential case.

4. The differential case of claim 1 wherein said one aperture has a first dimension only slightly greater than an outside diameter of a side gear of the gearset.

5. The differential case of claim 4 wherein said first dimension permits the side gear to be initially angulated relative to a central rotary axis of the differential case during assembly into the chamber and subsequently aligned relative thereto.

6. The differential case of claim 1 wherein said gearset includes a pair of side gears and a pair of pinion gears retained within said chamber.

7. The differential case of claim 6 further comprising a thrust plate disposed between each of said pinion gears and said differential case adjacent said chamber to absorb thrust loading and provide a hardened sliding surface against which each pinion gear can rotate.

8. The differential case of claim 1 wherein said differential case is formed from a material selected from the group including aluminum and magnesium.

9. The differential case of claim 1 wherein said chamber includes generally spherically shaped cavities for retaining at least two of said gears therein.

10. The differential case of claim 1 wherein the other of said apertures is substantially rectangularly shaped.

11. A differential assembly for a motor vehicle comprising:
   a differential case including a chamber; and
   a gearset retained in said chamber, wherein said differential case includes an aperture providing access to said chamber such that a pair of pinion gears and a pair of side gears may be passed through said aperture into said chamber, said aperture being defined by a semi-elliptical segment having ends connected to substantially perpendicularly oriented elongated segments.

12. The differential assembly of claim 11 wherein said semi-elliptical segment includes a center point at the intersection of its minor and major axes, said center point being substantially positioned along a line extending through the intersection point of the gear axes of rotation, wherein said line extends substantially perpendicularly from a plane including the gear axes.

13. The differential assembly of claim 12 wherein said major axis of said semi-elliptical segment forms an angle of approximately 45 degrees with the axis of rotation of said side gears.

14. The differential assembly of claim 11 wherein said aperture has a first dimension only slightly greater than an outside diameter of one of said side gears such that said side gear can be initially angulated relative to a central rotary axis of said differential case during assembly into said chamber and subsequently aligned relative thereto.

15. The differential assembly of claim 11 wherein said elongated segments are interconnected by an arcuate segment.

16. The differential assembly of claim 11 wherein said differential case includes a substantially rectangular aperture diametrically opposed to said aperture having said semi-elliptical segment.

17. A differential assembly for delivering drive torque to the wheels of a motor vehicle while permitting speed differentiation therebetween, said differential assembly comprising:
   a differential case including a chamber; and
   a gearset retained in said chamber, said gearset including a pair of pinion gears supported for rotation about a first longitudinal axis and a pair of side gears supported for rotation about a second longitudinal axis, said second longitudinal axis being perpendicular to said first longitudinal axis;
   wherein said differential case includes an assembly window defined by a semi-elliptical segment having ends connected to elongated segments, said elongated segments being positioned substantially symmetrically about the minor axis of said semi-elliptical segment.

18. The differential assembly of claim 17 wherein one of said elongated segments extends substantially parallel to said first longitudinal axis.

19. The differential assembly of claim 18 wherein the other of said elongated segments extends substantially parallel to said second longitudinal axis.

20. The differential assembly of claim 19 wherein said differential case includes another assembly window diametrically opposed from said assembly window.

21. The differential assembly of claim 20 wherein said another window is substantially rectangular in shape having at least one dimension greater than a maximum dimension of one of said side gears.

22. The differential assembly of claim 17 wherein said semi-elliptical segment extends for greater than 180 degrees such that the radii at the terminal ends of the semi-elliptical segment tangentially meet with the elongated segments.

* * * * *